US011521487B2

(12) United States Patent
Guan et al.

(10) Patent No.: US 11,521,487 B2
(45) Date of Patent: Dec. 6, 2022

(54) SYSTEM AND METHOD TO GENERATE TRAFFIC CONGESTION ESTIMATION DATA FOR CALCULATION OF TRAFFIC CONDITION IN A REGION

(71) Applicant: HERE Global B.V., Eindhoven (NL)

(72) Inventors: Yuxin Guan, Chicago, IL (US); Jingwei Xu, Chicago, IL (US); Arnold Sheynman, Chicago, IL (US); Bruce Bernhardt, Chicago, IL (US); Weimin Huang, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 167 days.

(21) Appl. No.: 16/707,894

(22) Filed: Dec. 9, 2019

(65) Prior Publication Data
US 2021/0174669 A1 Jun. 10, 2021

(51) Int. Cl.
G08G 1/01 (2006.01)
G06K 9/62 (2022.01)
G08G 1/052 (2006.01)
G06V 20/58 (2022.01)
G06V 20/56 (2022.01)

(52) U.S. Cl.
CPC ......... G08G 1/0133 (2013.01); G06K 9/6256 (2013.01); G06V 20/584 (2022.01); G06V 20/588 (2022.01); G08G 1/052 (2013.01); G06V 2201/08 (2022.01)

(58) Field of Classification Search
None
See application file for complete search history.

(56) References Cited

U.S. PATENT DOCUMENTS 8,825,350 B1    9/2014  Robinson
9,552,725 B2 *  1/2017  Feldman .............. G08G 1/0104
(Continued)

FOREIGN PATENT DOCUMENTS

WO    2018141403 A1    8/2018

OTHER PUBLICATIONS

Wikipedia, "Self-driving car", retrieved from https://en.wikipedia.org/wiki/Autonomous_car, Mar. 2018, pp. 1-43.
(Continued)

Primary Examiner — Santiago Garcia
(74) Attorney, Agent, or Firm — Ditthavong, Steiner & Mlotkowski

(57) ABSTRACT

A system, a method, and a computer program product may be provided for generating traffic congestion estimation data of one or more lanes in a region. A system may include a memory configured to store computer program code and a processor configured to execute the computer program code to obtain image data associated with the region. The processor may be configured to determine a count of one or more first movable objects in one or lanes, based on image data, calculate a lane object static capacity of the one or more lanes, based on one or more map free flow or speed limit attributes associated with the one or more lanes and generate the traffic congestion estimation data based on count of first movable objects in the one or more lanes, the moving speed of movable objects crossing multiple image frames, the lane object static capacity of lanes.

17 Claims, 9 Drawing Sheets

(56) References Cited

U.S. PATENT DOCUMENTS

| | | | |
|---|---|---|---|
| 9,587,951 B1* | 3/2017 | Hamida | G01C 21/32 |
| 9,672,734 B1* | 6/2017 | Ratnasingam | G08G 1/0968 |
| 2005/0033504 A1* | 2/2005 | Rennels | G08G 1/09675 |
| | | | 701/117 |
| 2007/0208492 A1* | 9/2007 | Downs | G08G 1/0104 |
| | | | 701/117 |
| 2008/0294331 A1* | 11/2008 | Fushiki | G08G 1/096827 |
| | | | 701/119 |
| 2011/0205086 A1* | 8/2011 | Lamprecht | G08G 1/087 |
| | | | 340/928 |
| 2012/0072096 A1* | 3/2012 | Chapman | G08G 1/096811 |
| | | | 701/118 |
| 2014/0085112 A1* | 3/2014 | Gruteser | G08G 1/14 |
| | | | 340/932.2 |
| 2014/0358414 A1* | 12/2014 | Ibrahim | G08G 1/0129 |
| | | | 701/118 |
| 2016/0042234 A1* | 2/2016 | Chen | G08G 1/0133 |
| | | | 382/190 |
| 2017/0069201 A1* | 3/2017 | Sedlik | B64C 39/024 |
| 2017/0132916 A1* | 5/2017 | Ioli | G08G 1/091 |
| 2017/0243485 A1* | 8/2017 | Rubin | H04W 4/026 |
| 2018/0293885 A1* | 10/2018 | Lee | G08G 1/0133 |
| 2018/0342156 A1* | 11/2018 | Martin | G08G 1/0145 |
| 2019/0126922 A1* | 5/2019 | Natroshvili | G06K 9/00805 |
| 2019/0311612 A1* | 10/2019 | Johnson | G08G 1/0116 |
| 2020/0111354 A1* | 4/2020 | Hofman | G08G 1/083 |
| 2020/0273326 A1* | 8/2020 | Shotton | H04W 4/80 |
| 2020/0298858 A1* | 9/2020 | Stenneth | G05D 1/0088 |
| 2020/0320873 A1* | 10/2020 | Du | G08G 1/01 |
| 2020/0334982 A1* | 10/2020 | Wisnewski | G08G 1/0116 |
| 2020/0365015 A1* | 11/2020 | Nguyen | G08G 1/0133 |
| 2020/0372792 A1* | 11/2020 | Li | G06K 9/00288 |
| 2020/0386557 A1* | 12/2020 | Hansson | G01C 21/30 |
| 2020/0393267 A1* | 12/2020 | Pandit | G01C 21/3641 |
| 2021/0027629 A1* | 1/2021 | Tao | G05D 1/0214 |
| 2021/0065548 A1* | 3/2021 | Li | G08G 1/0969 |
| 2021/0183099 A1* | 6/2021 | Fujii | G06T 7/33 |
| 2021/0209946 A1* | 7/2021 | Eilertsen | G08G 1/096811 |

OTHER PUBLICATIONS

Patel et al., "Introduction to Deep Learning: What Are Convolutional Neural Networks?", MathWorks, From the series: Introduction to Deep Learning, retrieved from https://www.mathworks.com/videos/introduction-to-deep-learning-what-are-convolutional-neural-networks-1489512765771.html, Mar. 24, 2017, pp. 1-4.

Office Action for related European Patent Application No. 20212563.9-1203, dated May 12, 2021, 11 pages.

* cited by examiner

| Lane Number | Direction | Lane Attributes | Capacity | Vehicle Count | Timestamp | Traffic Condition |
|---|---|---|---|---|---|---|
| 1 | East | Left Turn | 5 | 3 | 2018-12-01, 12:00:00 | 60% |
| 2 | East | Straight | 20 | 8 | 2018-12-01, 12:00:00 | 40% |
| 3 | East | Straight | 20 | 7 | 2018-12-01, 12:00:00 | 35% |
| 4 | East | Right Turn | 5 | 2 | 2018-12-01, 12:00:00 | 40% |
| 5 | West | Left Turn | 5 | 4 | 2018-12-01, 12:00:00 | 80% |
| 6 | West | Straight | 20 | 9 | 2018-12-01, 12:00:00 | 45% |
| 7 | West | Right Turn | 5 | 2 | 2018-12-01, 12:00:00 | 40% |

FIG. 6

SYSTEM AND METHOD TO GENERATE TRAFFIC CONGESTION ESTIMATION DATA FOR CALCULATION OF TRAFFIC CONDITION IN A REGION

TECHNOLOGICAL FIELD

The present disclosure generally relates to routing and navigation systems, and more particularly relates to generation of traffic congestion estimation data to calculate traffic condition on one or more lanes associated with an intersection of a road.

BACKGROUND

Autonomous driving has been a hot trend in recent years. An autonomous vehicle may use different sensor technologies to reach a right decision strategy to drive along the road in a road network. Different sensor technologies may include camera, GPS (Global Positioning System), IMU (Inertial Measurement Unit). In most scenarios, the vehicles would be driverless or fully non-human involved vehicles.

Traffic conditions play a critical role in the autonomous driving. Presently, current autonomous driving strategies are still focused on highways that do not involve any intersections. The intersection on the road may be associated with a traffic sign, a traffic light, or pedestrian activity on lanes of the road. However, to bring the full autonomous driving into life of people, estimation of arterial traffic on lane level, especially at intersection of the road is required. This has been a long-standing challenge. The estimation of traffic at the intersection on the road relies on volume and quality of data, such as, vehicle probe data, mobile probe data, and magnetic loop sensor data. Further, in many scenarios, it is a challenge to obtain the vehicle probe data, the mobile probe data which are owned by different companies and personal privacy may also be involved. In certain other scenarios, GPS signal may be limited in certain areas (such as, downtown area) and quality of probe data may also be limited. Consequently, it may affect the estimation of real traffic situation.

Accordingly, there is a need to determine the traffic conditions under circumstances, such as, where GPS coordinates may be weak or unavailable, the probe data may be unreliable, and the intersection on the road with two or more lanes may be involved. There is a need for a system that facilitates autonomous driving on roads with intersection.

BRIEF SUMMARY

Accordingly, there is a need for a reliable system that calculates traffic condition by generating traffic congestion estimation data. A system, a method, and a computer program product are provided herein that focuses on generating the traffic congestion estimation data, based on number of vehicles (movable objects) and vehicle capacity of a particular lane.

In one aspect, the system for generating traffic congestion estimation data associated with one or more lanes in a region may be provided. The system may include at least one non-transitory memory configured to store computer program code; and at least one processor (hereinafter referred as processor) configured to execute the computer program code to obtain image data associated with the region. The processor may be configured to determine a count of one or more first movable objects in the at least one lane, based on the image data. The processor may be further configured to calculate a lane object static capacity of the at least one lane, based on one or more map free flow or speed limit attributes associated with the at least one lane. The processor may be further configured to calculate a lane object dynamic capacity of the at least one lane, based on the one or more map free flow or speed limit attributes associated with the at least one lane and a current speed on the lane object derived from the image data. The processor may be further configured to generate the traffic congestion estimation data, based on the count of the one or more first movable objects in the at least one lane and the lane object static capacity of the at least one lane.

According to some example embodiments, the processor may be configured to determine the count of the one or more first movable objects. The processor may be further configured to obtain lane level information of the region which is based on map data of the region. The processor may be further configured to identify one or more second movable objects in the region. The processor may be further configured to identify the one or more first movable objects in the at least one lane based on the identified one or more second movable objects and the lane level information. The one or more second movable objects may be identified using a trained machine learning model from image frames obtained from the image data. The one or more second movable objects may be map matched at lane level by using map data from map database. The map matched objects may be referred as first movable objects.

According to some example embodiments, the one or more map free flow or speed limit attributes include a functional class or geometry information associated with the at least one lane.

According to some example embodiments, the processor may be further configured to calculate a traffic condition for the at least one lane based on the traffic congestion estimation data. The traffic condition may be a ratio between the count of the one or more first movable objects and the lane object static capacity.

According to some example embodiments, the processor may be further configured to retrieve traffic light (TL) cycle information for the at least one lane and validate the traffic condition based on the TL cycle information.

According to some example embodiments, the system may be configured to transmit a report of the traffic condition to a backend server.

According to some example embodiments, the system may be configured obtain map data of the region and update the map data of the region based on the validated traffic condition.

Embodiments disclosed herein may provide a method for generating traffic congestion estimation data associated with at least one lane in a region may be provided. The method may include obtaining, by one or more processors, image data associated with the region; determining, by one or more processors, a count of one or more movable objects appearing in multiple image frame data, determining, by one or more processors, a count of one or more movable objects moving speed based on image data consisting of multiple image frame along with associated timestamp data, calculating, by one or more processors, a lane object static capacity of the at least one lane, based on one or more map free flow or speed limit attributes associated with the at least one lane; generating, by one or more processors, the traffic congestion estimation data based on the count of the one or more first movable objects in the at least one lane and the lane object static capacity of the at least one lane, and generating, by one or more processors, the traffic congestion estimation data based on the count of the one or more first movable objects in the at least one in image data consisting of multiple image frame.

Embodiments of the present disclosure may provide a computer programmable product including at least one non-transitory computer-readable storage medium having computer-executable program code stored therein. The computer programmable product comprising a non-transitory computer readable medium having stored thereon computer executable instructions, which when executed by a computer, cause the computer to carry out operations, for generating traffic congestion estimation data associated with at least one lane in a region, the operations comprising: obtaining, by one or more processors, image data associated with the region; determining, by one or more processors, a count of one or more first movable objects in the at least one lane, based on the image data; calculating, by one or more processors, a lane object static capacity of the at least one lane, based on one or more map free flow or speed limit attributes associated with the at least one lane; and generating, by one or more processors, the traffic congestion estimation data based on the count of the one or more first movable objects in the at least one lane and the lane object static capacity of the at least one lane.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
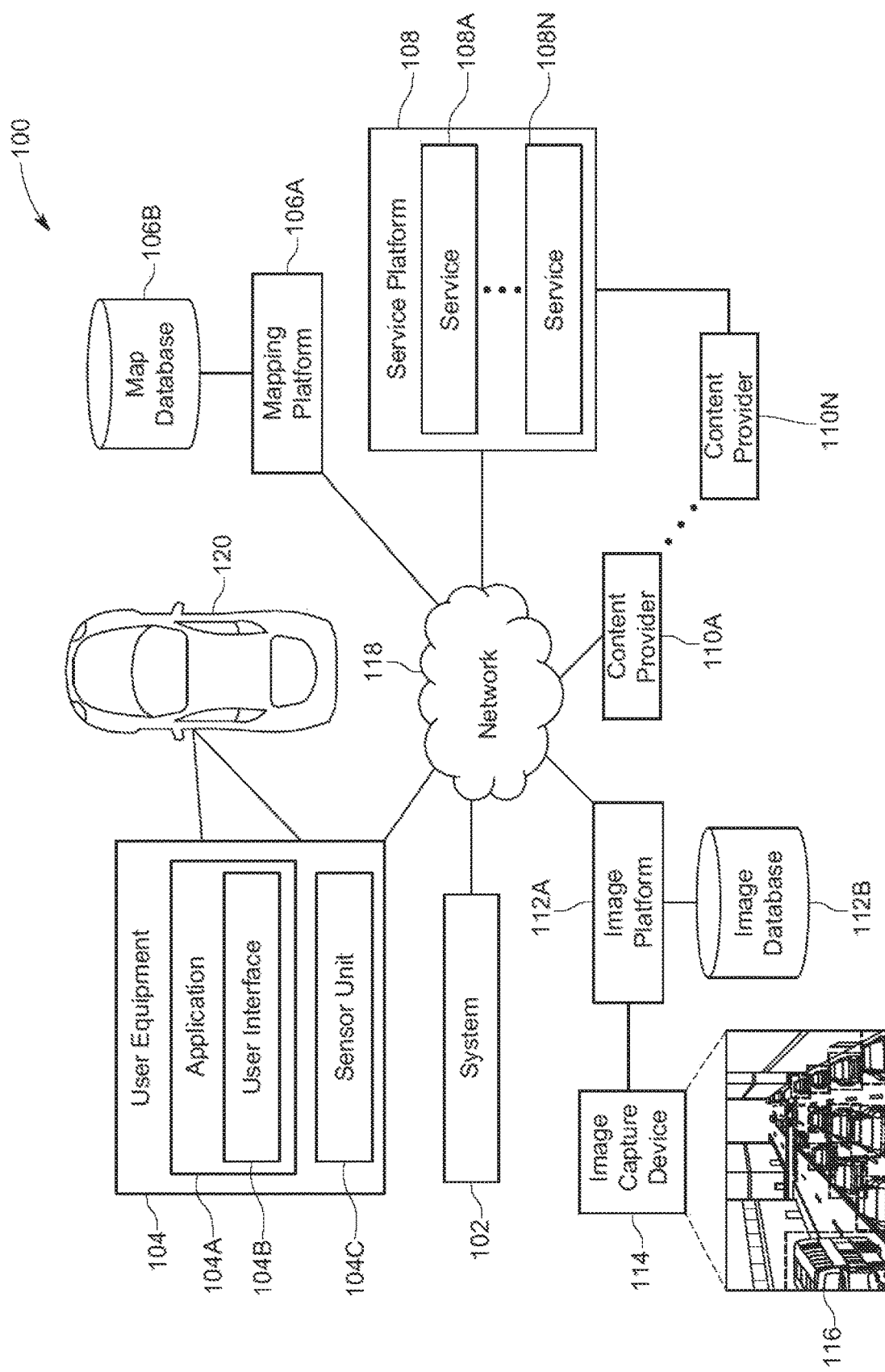
Figure 2:
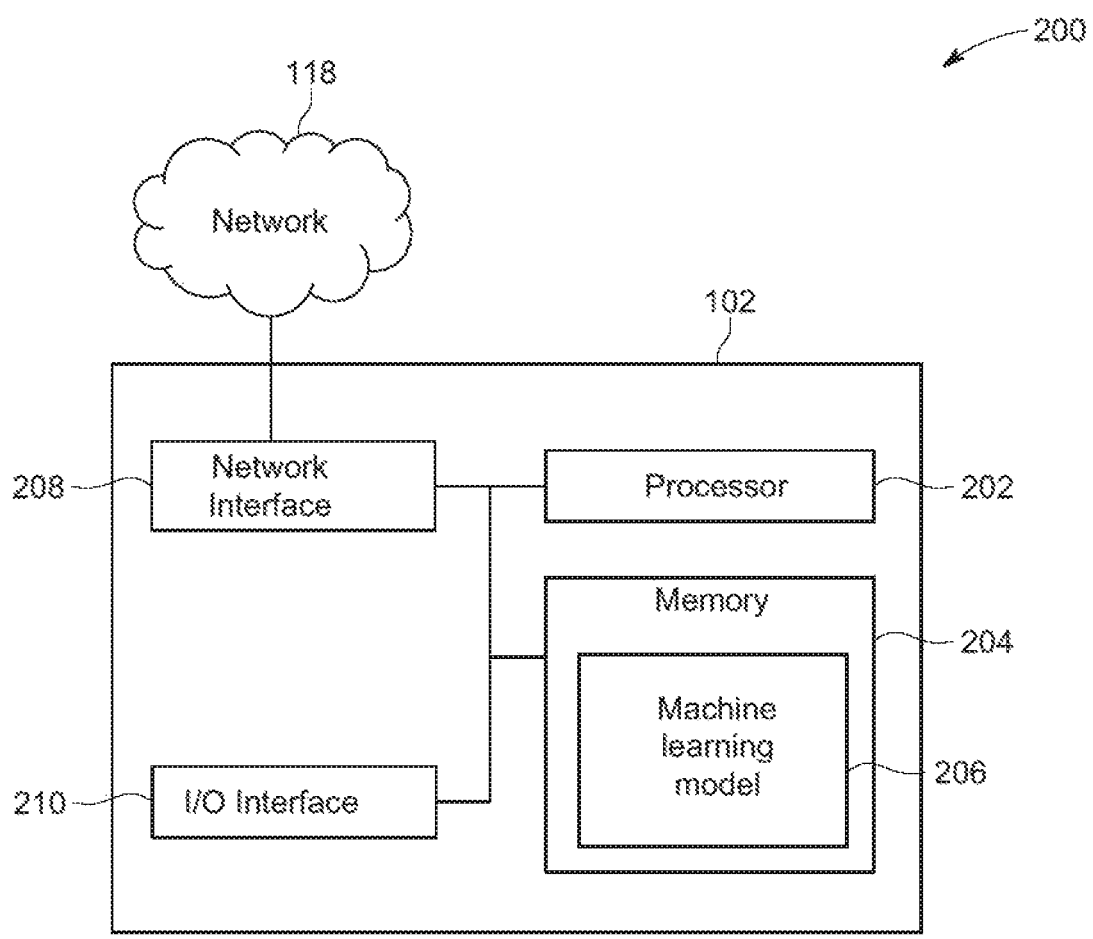
Figure 3:
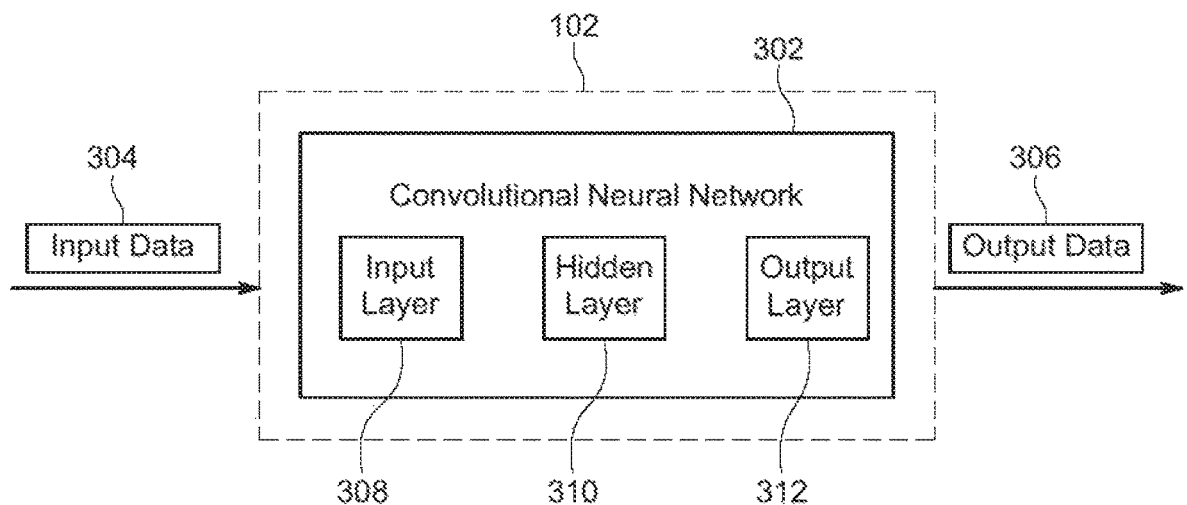
Figure 4A:
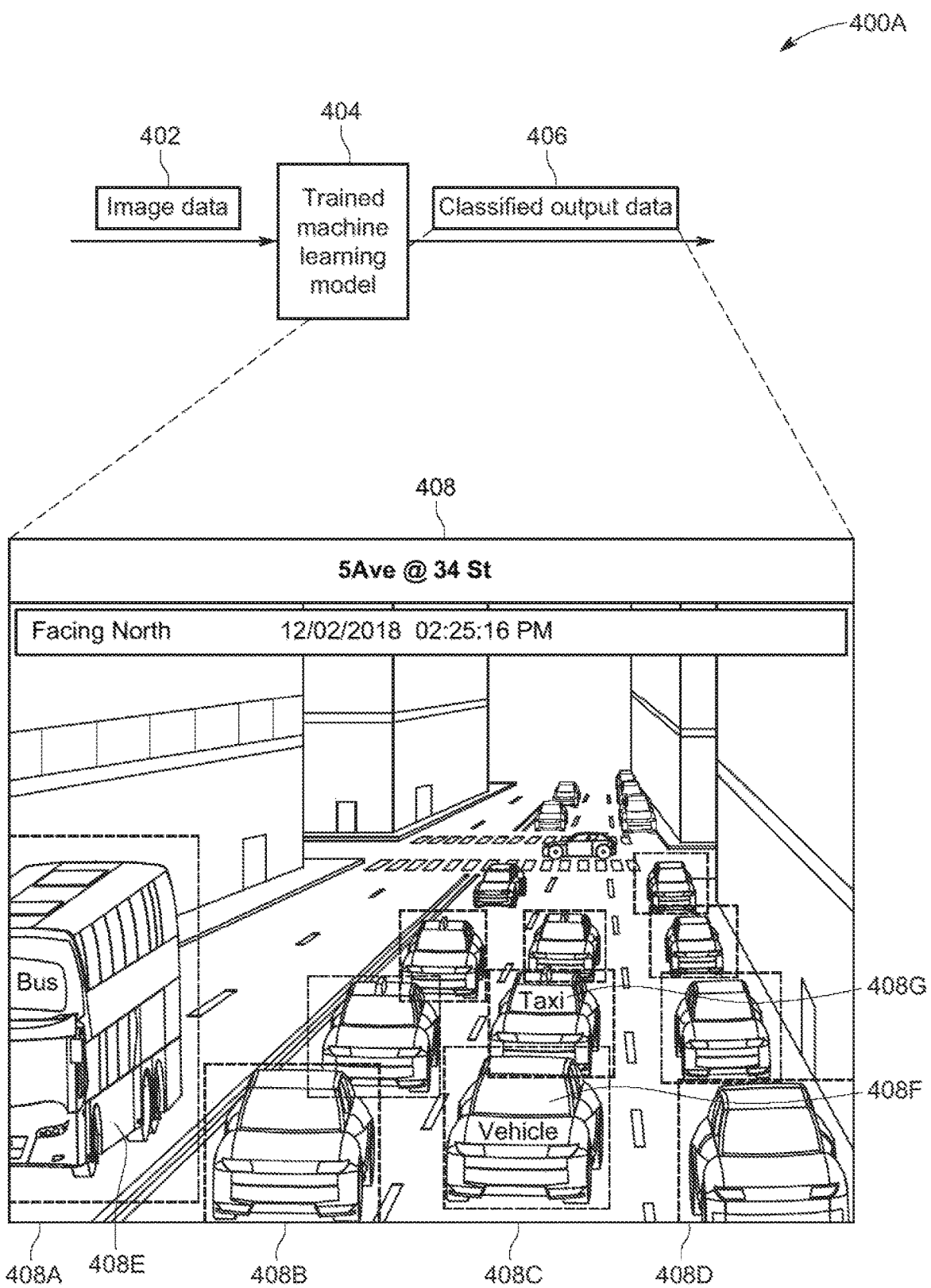
Figure 4B:
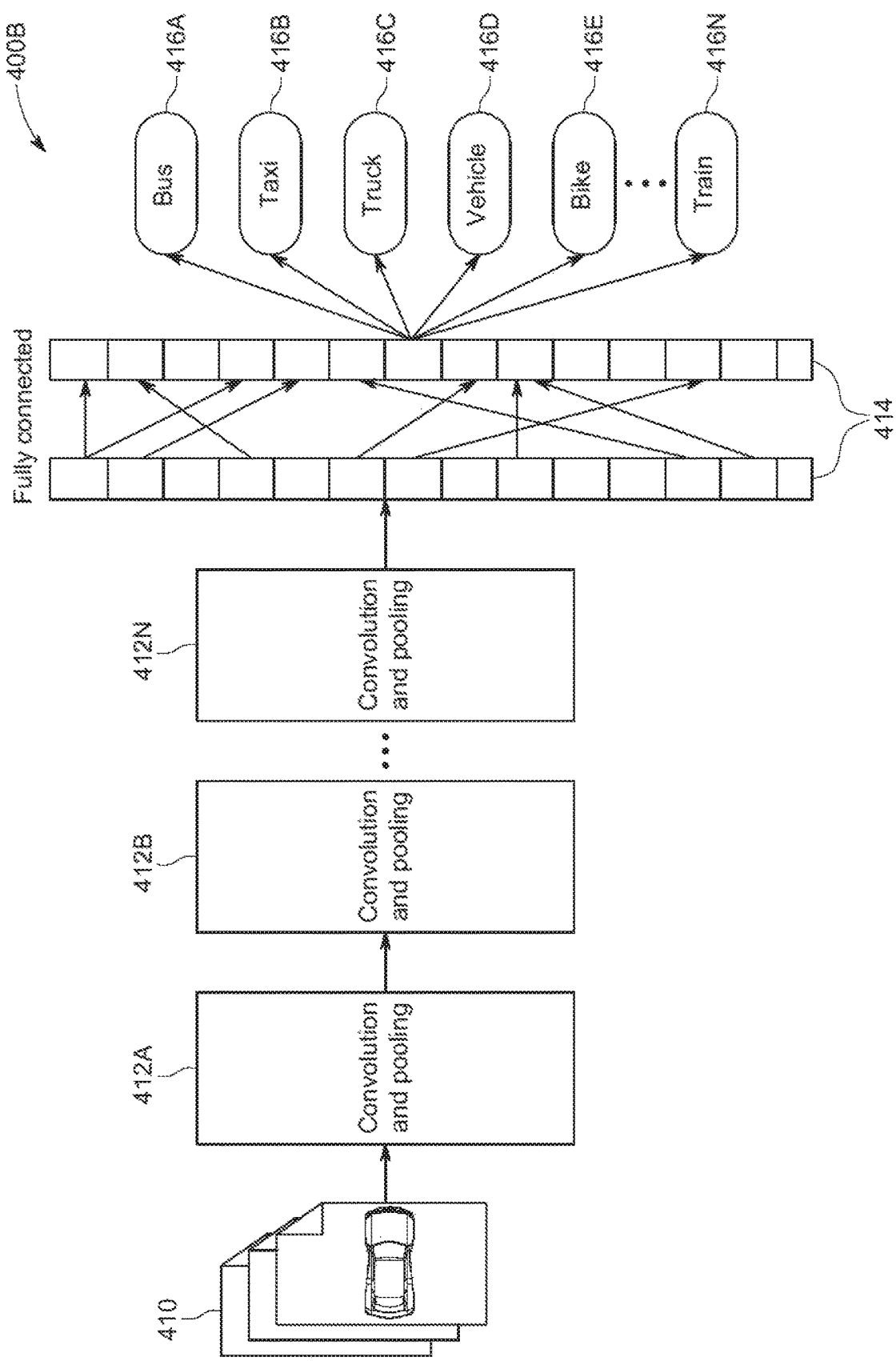
Figure 5:
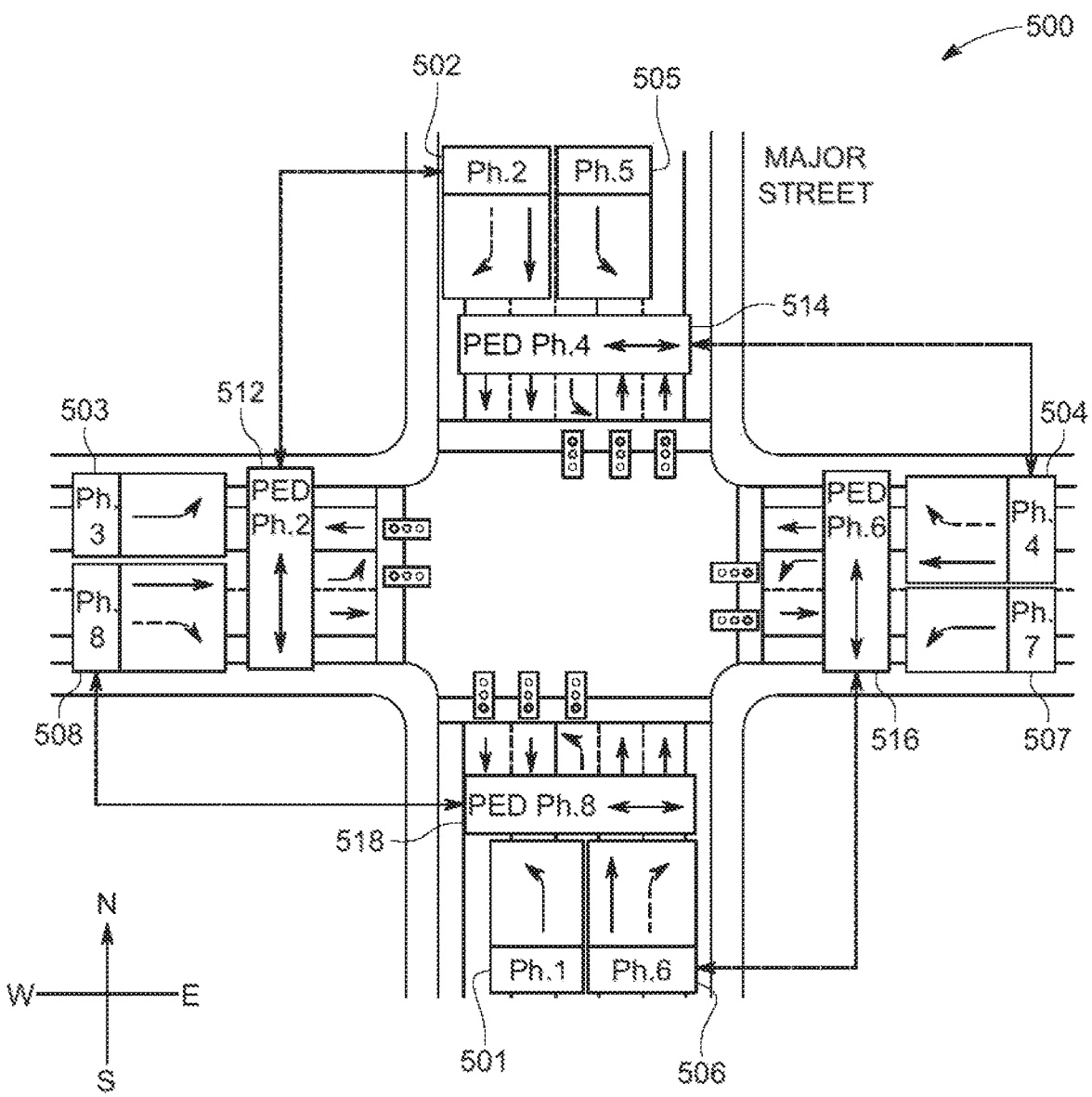
Figure 7:
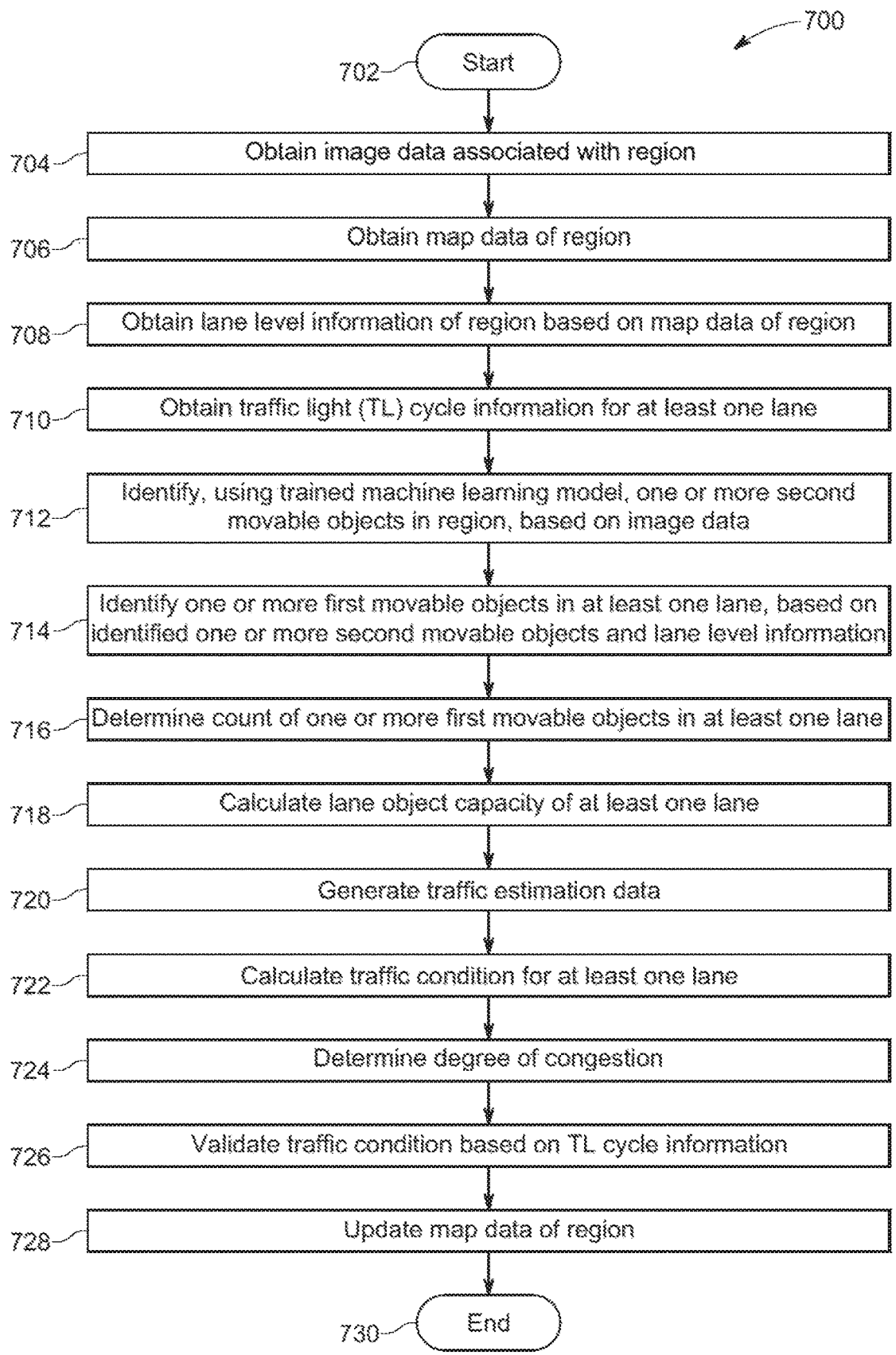
Figure 8:
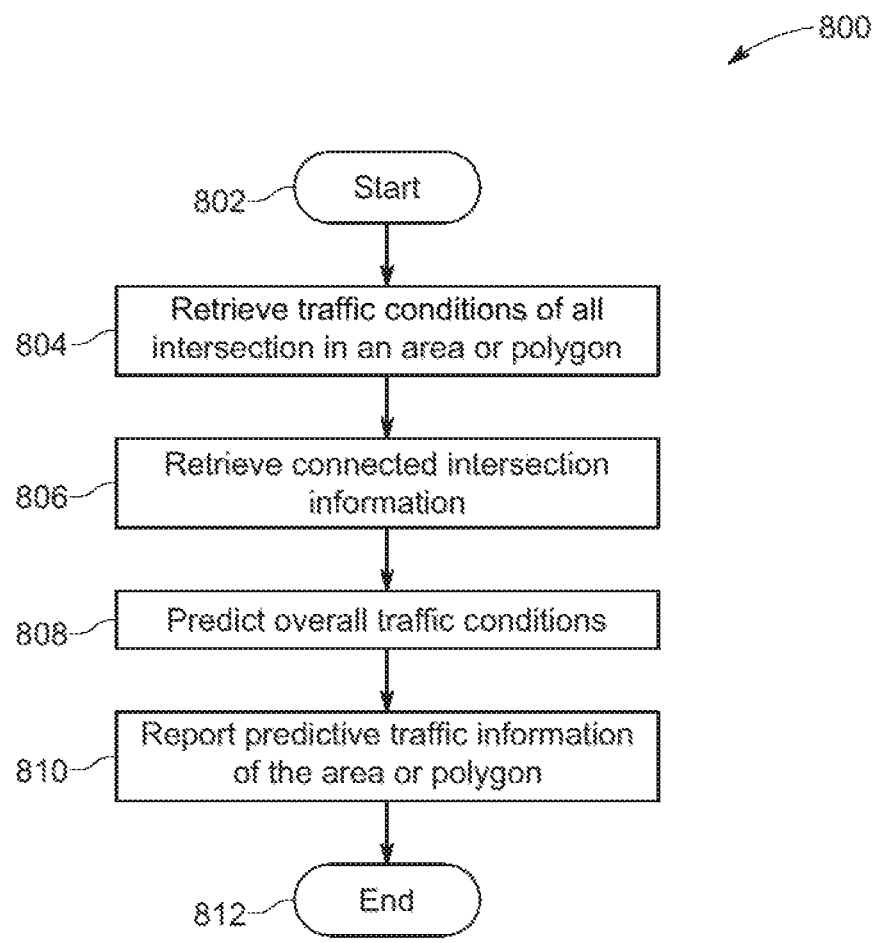

Having thus described example embodiments of the disclosure in general terms, reference will now be made to the accompanying drawings, which are not necessarily drawn to scale, and wherein:

FIG. 1 is a block diagram that illustrates a network environment 100 of a system for calculation of traffic conditions of one or more lanes associated with an intersection in a region, in accordance with an example embodiment;

FIG. 2 illustrates a block diagram of the system, exemplarily illustrated in FIG. 1, that may be used for determination of traffic conditions of one or more lanes associated with an intersection in a region, in accordance with an example embodiment;

FIG. 3 exemplarily illustrates a schematic diagram for training a machine leaning model, such as a Convolutional Neural Network (CNN) model to identify movable objects in one or more lanes on a road in a region, in accordance with an example embodiment;

FIGS. 4A and 4B, collectively, exemplarily illustrate block diagrams for implementation of a machine learning model, such as a Convolutional Neural Network (CNN) model in the system to identify objects on one or more lanes on a road associated with an intersection in a region for calculation of traffic conditions, in accordance with an example embodiment;

FIG. 5 exemplarily illustrates a schematic diagram for an exemplary scenario where the system determines traffic conditions associated with connected intersections for a road network in a region with traffic light cycle data, in accordance with an example embodiment;

FIG. 6 exemplarily illustrates a tabular representation of calculating traffic conditions of plurality of lanes associated with an intersection in a region by the system, in accordance with an example embodiment;

FIG. 7 illustrates a flowchart for implementation of an exemplary method to calculate traffic condition of one or more lanes associated with an intersection in a region, in accordance with an example embodiment; and FIG. 8 illustrates a flowchart for implementation of an exemplary method to calculate traffic condition of connected intersection in an area or polygon, in accordance with an embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, systems and methods are shown in block diagram form only in order to avoid obscuring the present disclosure.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. Also, reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being displayed, transmitted, received and/or stored in accordance with embodiments of the present disclosure. Thus, use of any such terms should not be taken to limit the spirit and scope of embodiments of the present disclosure.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may refer to any connecting pathway with multiple lanes including, but not limited to, a roadway, a highway, a freeway, an expressway, a lane, a street path, a road, an alley, a controlled access roadway, a free access roadway, and the like.

The term "route" may refer to a path from a source location to a destination location on any link.

The term "road sign" may refer to any traffic or non-traffic related sign, such as a speed limit sign, a distance indicating sign, a destination sign board, a diversion sign, a warning sign, a toll indicating sign, a lane indicating sign, a sign showing a curvature ahead, a sign showing a sharp turn, a sign showing static and/or dynamic speed limits and the like.

The term 'autonomous vehicle' may refer to any vehicle having autonomous driving capabilities at least in some conditions. An autonomous vehicle, as used throughout this disclosure, may refer to a vehicle having autonomous driving capabilities at least in some conditions. The autonomous vehicle may also be known as a driverless car, robot car, self-driving car or autonomous car. For example, the vehicle may have zero passengers or passengers that do not manually drive the vehicle, but the vehicle drives and maneuvers automatically. There can also be semi-autonomous vehicles. End of Definitions FIG. 1 is a block diagram that illustrates a network environment 100 of operation of a system for calculation of traffic conditions of each lane of plurality of lanes associated with an intersection in a region, in accordance with an example embodiment.

There is shown a network environment 100 that may include a system 102, a user equipment (UE) 104, an application 104A, a user interface 104B, a sensor unit 104C, a mapping platform 106A, a map database 106B, a services platform 108 with a plurality of services 108A . . . 108N, a plurality of content providers 110A . . . 110N, an image platform 112A, an image database 112B, an image capture device 114, an image 116, and a network 118. There is further shown one or more vehicles, such as a vehicle 120 on a road. The UE 104 may include the application 104A, the user interface 104B, and the sensor unit 104C. The system 102 may be communicatively coupled to the UE 104, via the network 118. Also, the system 102 may be communicatively coupled to the services platform 108 and the plurality of content providers 110A . . . 110N, via the network 118. The system 102 may be communicatively coupled to the image database 112B of the image platform 112A, via the network 118. Further, the image database 112B may be communicatively coupled to one or more image capture devices, such as an image capture device 114.

In some example embodiments, the system 102 may be implemented in a cloud computing environment. In some other example embodiments, the system 102 may be implemented in the vehicle 120. All the components in the network environment 100 may be coupled directly or indirectly to the network 118. The components described in the network environment 100 may be further broken down into more than one component and/or combined together in any suitable arrangement. Further, one or more components may be rearranged, changed, added, and/or removed.

The system 102 may comprise suitable logic, circuitry, and interfaces that may be configured to determine the traffic conditions of each lane of the plurality of lanes of the road associated with the intersection in the region. Further, the system 102 may be configured to determine a count of one or more first movable objects in a lane, based on image data. The system 102 may be configured to calculate a lane object static capacity of the at least one lane, based on one or more map free flow or speed limit attributes associated with the at least one lane. The system 102 may be configured to generate the traffic congestion estimation data based on the count of the one or more first movable objects in the lane and the lane object static capacity of the lane. Additionally or alternatively, the system 102 may be configured to receive geo-coordinates of the region from map data stored in the map database 106B.

The UE 104 may comprise suitable logic, circuitry, and interfaces that may be configured to provide navigation assistance to the vehicles, such as, the vehicle 120 among other services. In accordance with an embodiment, the UE 104 may be configured to provide navigation and map functions (such as, guidance and map display) along with the traffic conditions of a route for an end user (not shown in the FIG. 1). The traffic conditions may indicate a degree of congestion in each lane. The degree of congestion may correspond to one of a heavy congestion, a mild congestion and a light congestion on the road with the intersection. The vehicle 120 associated with the UE 104 may correspond to an autonomous vehicle or a manually driven vehicle. An autonomous vehicle, as used throughout the disclosure, may refer to a vehicle which has autonomous driving capabilities at least in some conditions. For example, the autonomous vehicle may exhibit autonomous driving on streets and roads having physical dividers between driving lanes, roads having intersection. The intersection may be associated with one or more of a traffic sign, a traffic light, a bus lane, a bike lane or pedestrian traffic. The UE 104 may be a part of the vehicle 120. The UE 104 may be installed in the vehicle 104. In accordance with an embodiment, the UE 104 may be the vehicle itself.

The UE 104 may include the application 104A with the user interface 104B, and the sensor unit 104C. In accordance with an embodiment, the UE 104 may be an in-vehicle navigation system, such as, an infotainment system, a personal navigation device (PND), a portable navigation device, a cellular telephone, a smart phone, a personal digital assistant (PDA), a watch, a camera, a computer, a workstation, and other device that may perform navigation-related functions (such as digital routing and map display). Examples of the UE 104 may include, but is not limited to, a mobile computing device (such as a laptop computer, tablet computer, mobile phone and smart phone), navigation unit, personal data assistant, watch, and camera. Additionally or alternatively, the UE 104 may be a fixed computing device, such as a personal computer, computer workstation, kiosk, office terminal computer or a system.

In accordance with an embodiment, the UE 104 may be an in-vehicle navigation system for navigation and map functions (such as, guidance and map display). The UE 104 may include the application 104A with the user interface 104B to access one or more map and navigation related functions that may include traffic condition notification rendered by the system 102. In other words, the UE 104 may include the application with the user interface 104B. The user interface 104B may be configured to enable the end user associated with the UE 104 to access the system 102.

The sensor unit 104C may be configured within the UE 104. The sensor unit 104C comprising multiple sensors may capture one or more traffic images associated with at least one intersection in the region in real time or near real time.

For example, the sensor unit 104C may include an image capture device (such as, a camera) to capture the one or more traffic images associated with the at least one intersection in the region. In accordance with an embodiment, the UE 104 may be accessible to the system 102 via the network 118. In certain embodiments, the sensor unit 104C may be configured to detect road signs for determination of positioning of the vehicle 120. In accordance with an embodiment, the sensor unit 104C may be built-in, or embedded into, or within interior of the UE 104. In some embodiments, the vehicle 120 may have sensors positioned on or within the vehicle 120. The sensors may generate sensor data from systems that include, but not limited to, a positioning system, a Global Navigation Satellite System (such as Global Positioning System (GPS), Galileo, GLONASS and BeiDou), cellular tower location methods, access point communication fingerprinting (such as Wi-Fi or Bluetooth based radio maps). In accordance with an embodiment, the sensor unit 104C may be configured to transmit the sensor data to an Original Equipment Manufacturer (OEM) cloud. Examples of the sensors in the sensor unit 104C may include, but not limited to, a camera, an acceleration sensor, a gyroscopic sensor, a LIDAR sensor, a proximity sensor, and a motion sensor.

The mapping platform 106A may comprise suitable logic, circuitry, and interfaces that may be configured to update data associated with the traffic conditions in the map database 106B. The mapping platform 106A may include techniques related to geocoding, routing (multimodal, intermodal, and unimodal), clustering algorithms, machine learning in location based solutions, natural language processing algorithms, artificial intelligence algorithms, and the like. The data for different modules of the mapping platform may be collected using a plurality of technologies including, but not limited to drones, sensors, connected cars, cameras, probes, chipsets and the like. In some embodiments, the mapping platform 106A may be embodied as a chip or chip set. In other words, the mapping platform 106A may comprise one or more physical packages (such as, chips) that includes materials, components and/or wires on a structural assembly (such as, a baseboard).

The map database 106B may comprise suitable logic, circuitry, and interfaces that may be configured to store data related to the traffic condition of the intersection. The data may include traffic data. The data may also include cartographic data, routing data, and maneuvering data. The traffic data may include a count of the identified one or more movable objects for each lane of the plurality of lanes associated with the intersection and capacity of each lane, based on one or more of lane function class and lane geometry. The traffic conditions may indicate a degree of congestion in each lane. The degree of congestion in each lane associated with the intersection may be classified into heavy congestion, mild congestion and light congestion.

The map database 106B may be configured to store data related to the traffic conditions of lanes on the road with intersection. The data may include, but not limited to, location of the intersection, diversions to be caused due to the heavy congestion, suggested routes to avoid heavy congestion to be caused due to the intersection. In accordance with an embodiment, the map database 106B may be configured to receive data related to the intersections (also include connected intersections) in the region for a road network from external systems, such as, one or more of background batch data services, streaming data services and third party service providers, via the network 118.

In some embodiments, the map database 106B may be a part of a mapping platform. The map database 106B may be a master map database stored in a format that facilitates updating, maintenance, and development. For example, the master map database or data in the master map database may be in an Oracle spatial format or other spatial format, such as, for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as the UE 104. The navigation-related functions may correspond to vehicle navigation, pedestrian navigation, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases may be performed by a party or entity separate from the map developer. For example, a customer of the map developer, such as a navigation device developer or other end user device developer, may perform compilation on a received map database 106B in a delivery format to produce one or more compiled navigation databases.

In some embodiments, the map database 106B may be a master geographic database configured on the side of the system 102. In accordance with an embodiment, a client-side map database may represent a compiled navigation database that may be used in or with end user devices (e.g., the UE 104) to provide navigation based on the traffic conditions, speed adjustment, and/or map-related functions to navigate through the plurality of lanes associated with the intersection in the region. The system 102 may identify traffic objects (also referred as objects), based on a trained identification model and such identified objects are map-matched on links of a map developed by the map developer.

Optionally, the map database 106B may contain lane segment and node data records or other data that may represent the plurality of lanes for the intersection on the road in the region, pedestrian lane or areas in addition to or instead of the vehicle road record data. The road/link segments and nodes may be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, and parks. The map database 106B may additionally include data about places, such as cities, towns, or other communities, and other geographic features such as bodies of water, mountain ranges, etc. In addition, the map database 106B may include event data (e.g., traffic incidents, construction activities, scheduled events, unscheduled events, etc.) associated with Point of Interest (POI) data records or other records of the map database 106B associated with the system 102.

The services platform 108 may provide the plurality of services (such as, navigation related functions and services) 108A ... 108N to the application 104A running on the UE 104. The services 108A ... 108N may include navigation functions, speed adjustment functions, traffic condition related updates, weather related updates, warnings and alerts, parking related services and indoor mapping services. In accordance with an embodiment, the services 108A ... 108N may be provided by the plurality of content providers 110A ... 110N. In some examples, the plurality of content providers 110A ... 110N may access various Software Development Kits (SDKs) from the services platform 108 for implementation of one or more services 108A ... 108N. In accordance with an embodiment, the services platform 108 and the system 102 may be integrated into a single platform to provide a suite of mapping and navigation related applications for OEM devices, such as the UE 104. The UE 104 may be configured to interface with the services platform 108, the plurality of content provider 110A ... 110N, and the system 102 over the network 118. Thus, the system 102 and the services platform 108 may enable provision of cloud-based services for the UE 104, such as, storing the data related to traffic conditions in the OEM cloud in batches or in real-time and retrieving the stored data for generating traffic condition notification.

The plurality of content providers 110A ... 110N may be configured to maintain data stored in the map database 106B. In accordance with an embodiment, the plurality of content providers 110A ... 110N may correspond to map developers which collect geographic data to generate and enhance the map database 106B. In accordance with an embodiment, the map developers may obtain data from other sources, such as municipalities or respective geographic authorities. In accordance with an embodiment, the map developer may collect data from consumer vehicles travelling on the road with the intersection throughout the geographic region. In accordance with an embodiment, the map developer may employ field personnel to travel by a vehicle along roads throughout the geographic region to observe features and/or record information. The map developers may crowdsource geographic map data to generate, substantiate, or update map data. For example, sensor data from a plurality of data probes, which may be, for example, vehicles traveling along a road network or within a venue, may be gathered and fused to infer an accurate map of an environment in which the data probes are moving. Such sensor data may be updated in real time or near real time such as on an hourly basis, to provide accurate and up to date map data. The sensor data may be from any sensor that may inform a map database of features within an environment that are appropriate for mapping. For example, motion sensors, inertia sensors, image capture sensors, proximity sensors, LIDAR (light detection and ranging) sensors, and ultrasonic sensors. The gathering of large quantities of crowd-sourced data may facilitate the accurate modeling and mapping of an environment, whether it is a road segment or the interior of a multi-level parking structure. In accordance with an embodiment, remote sensing, such as aerial or satellite photography, may be used to generate map geometries directly or through machine learning models, such as a Convolutional Neural Network (CNN).

The image database 112B of the image platform 112A may be a data storage medium that is configured to store a plurality of images of one or more areas or regions, such as a region 116, captured by the image capture device 114. Hereinafter, data stored in the image database 112B may be referred to as "image data". The image database 112B may be updated periodically by one or more devices in certain time interval. In accordance with an embodiment, the image data may be a real time video of an intersection provided by different public sources, private sources or the images captured by driving vehicles, such as the vehicle 120. Additionally, the image database 112B may store additional data captured along with the image data, such as, but not limited to, time of capture, location, and heading.

The image capture devices 114 may be traffic cameras or special cameras installed for capturing specific lane or all the lanes in an intersection of a road in a region. The image capture devices 114 may be an analog, digital still camera, analog, digital video camera, 3D/360° camera, or any device or apparatus which is configured to capture still/video images of a road section. The image capture devices 114 may be strategically placed in different locations of a lane to capture images of intersections, exists, driveways, corners, sideways or other points of interest of the lanes. The captured images are transmitted by the image capture devices 114 to a specific server, a cloud or the image database platform 112A. The still images may correspond to 2D, 3D or any other preferred dimension. The video images may be monochrome or color video images. The transfer of images may be done via the network 118. The image data may be stored as still image data or video image data. The system 102 may be configured to access the image database 112B of the image database platform 112A, via the network 118.

The network 118 may comprise suitable logic, circuitry, and interfaces that may be configured to provide a plurality of network ports and a plurality of communication channels for transmission and reception of data, such as the sensor data. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 118 may include a medium through which the system 102, and/or the other components may communicate with each other. The network 118 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 118 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) network, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

In operation, the system 102 may be configured to obtain the image data associated with at least one lane in the region 116. In accordance with an embodiment, the image data my correspond to a plurality of traffic images captured from one or more sensors, such as, imaging sensors (or the image capture device 114), for example, but not limited to, video cameras, dashboard cameras, web cameras, and camcorders. The plurality of traffic images of the image data may be associated with one or more intersections in a region. The image data may be stored in the image database 112B. In accordance with an embodiment, the image data may be obtained from at least one or more of background batch data services, streaming data services and third party service providers.

The region 116 may be determined by the system 102 in response to a request from a user. The determination of the region 116 may also be initiated autonomously by the system 102. The region 116 may be of any size or shape, such as, a rectangle, a circle, a trapezoidal, a square, a triangle, and a parallelogram.

The system 102 may employ a trained machine learning model (such as, a CNN model) as disclosed in the detailed description of FIG. 3A to 3C to calculate the traffic conditions of each lane of the plurality of lanes associated with the intersection on the road in the region 116. The system 102 may be configured to identify, using trained machine learning model, one or more objects (such as, one or more second movable objects) in the region 116, based on the image data, which is elaborated in FIG. 4A. The one or more second movable objects may include, but not limited to, a bus, a taxi, a vehicle, and a parking vehicle. In accordance with another embodiment, the movable objects may include pedestrians. In accordance with an embodiment, any deep machine learning technique, apart from the CNN model may be used to identify objects in the region 116.

The system 102 may be configured to obtain lane level information of the region 116 based on map data of the region 116. In accordance with an embodiment, the system 102 may be configured to compare (map match) current image data of a specific lane in the region 116 with map data (or historic map data) that may include lane level information of the region 116. For example, the specific lane may comprise multiple static and dynamic objects, such as, buildings, telephone booth, lamp post, parking vehicles, pedestrian, pavements, roads, vehicle present on the roads, traffic signals, and bus stand. The map data of the specific lane in the region 116 may be superimposed with live image data, and then the static objects may overlap in the images from the image data and the map data, while the dynamic or movable objects may not be superimposed. Therefore, by using map matching, movable objects in a lane (also referred as first movable objects) may be determined by the system 102 in the region 116. The first movable objects may correspond to, but not limited to, bus, taxi, private vehicle, tram, parked vehicle, and pedestrian. Further, alternatively different image segmentation techniques may be used for identifying the movable objects from the image data. Therefore, the system 102 may be configured to identify one or more first movable objects in one or more lanes, based on the identified one or more second movable objects and lane level information.

The system 102 may be configured to determine a count of one or more first movable objects in the one or more lanes, based on the image data. The system 102 may be further configured to calculate a lane capacity (hereinafter "lane object static capacity") of one or more lanes in the region 116, based on one or more map free flow or speed limit attributes associated with the one or more lanes. The one or more map free flow or speed limit attributes may comprise a functional class or geometry information associated with the at least one lane. The lane object static capacity may be expressed as a maximum number of vehicles, passengers or the like in a lane of a road that can pass a given point in unit time. In accordance with an embodiment, the unit time may usually be an hour, i.e., vehicles per hour per lane. The lane object static capacity may determine that how much traffic a given transportation facility can accommodate. The lane object static capacity expresses physical count of vehicles and passengers a road can afford. The lane object static capacity may depend on various map free flow or speed limit attributes of the lane or road, such as functional class of the lane, geometry information of the lane etc. Functional class is a road type indicator, reflecting traffic speed and volume, as well as the importance and connectivity of the road. The functional class may be defined by following types: Type 1: a road with high volume, maximum speed traffic; Type 2: a road with high volume, high speed traffic; Type 3: a road with high volume traffic; Type 4: a road with high volume traffic at moderate speeds between neighborhoods; and Type 5: a road whose volume and traffic flow are below the level of any other functional class. Further, in general three basic types of roads and streets may be identified in the functional classification process: arterials, collectors, and locals. Arterials are expected to provide direct routings for large volumes of traffic traveling long distances at high operating speeds. Collector roads may serve a dual function as they provide some degree of mobility and they also serve abutting property while servicing shorter trips and acting as feeders to the arterials. The roads in local system provide direct access to abutting property for relatively short trips and low volumes at the expense of free-flowing movement. Functional classification is a permanent but evolving representation of a road network. Demand for road access changes with economic growth and increasing prosperity, with relocation of population, economic activities and trade routes, and with expansion of urban areas and concerns for the environment. The functional classification may be updated periodically to take account of changes in transport demands and the road network to fulfill its role as a management tool.

Geometric information of the roadway design can be broken into three main parts: alignment, profile, and cross-section. The combination of the three elements creates a three-dimensional layout for a roadway. The alignment is the route of the road, defined as a series of horizontal tangents and curves. The profile is the vertical aspect of the road, including crest and sag curves, and the straight grade lines connecting them. The cross section shows the position and number of vehicle and bicycle lanes and sidewalks, along with their cross slope or banking. Cross sections also show drainage features, pavement structure and other items outside the category of geometric design. The lane object static capacity may be calculated by the factors mentioned above. The lane object static capacity may be calculated for different kind of intersections, such as free flow (No intersection or intersection where the crossroad stops), signal (Intersection controlled by a traffic signal), all stop (the intersection is an all-way stop) and stop sign (the approach has to stop for the crossroad).

The system 102 may be configured to generate the traffic congestion estimation data based on the count of the first movable objects in the specific lane and the lane object static capacity of the specific lane. Additionally, the traffic congestion estimation data may be used to determine traffic condition of the specific lane. The traffic condition may be classified as traffic congestion. The traffic congestion may hamper drivers, for example by prolonging travel time, by increasing the likelihood of collisions, or by forcing drivers onto unfamiliar or undesirable travel routes. Therefore, information about traffic patterns, if collected and relayed to drivers in a timely manner, may allow drivers to adjust their travel plans to increase safety and convenience. The degree of congestion may be classified into different category, such as heavy congestion, moderate congestion or no congestion. For example, the traffic congestion may be classified into heavy congestion when the value of the congestion lies in between 70%-100%, the traffic congestion may be classified into moderate congestion when the value of the congestion lies in between 50%-69% and may be classified into no congestion when the value of the congestion lies in between 1%-49%.

Based on the traffic congestion estimation data generated by the system 102, a user of a vehicle (such as the vehicle 120) or the vehicle 120 itself can make an appropriate decision to drive safely, avoid traffic congestion and identify the best route. In an embodiment, the vehicle 120 may change its maneuver, based on the generated traffic congestion estimation data to drive safely and thereby creating a safer city.

FIG. 2 illustrates a block diagram 200 of the system, exemplarily illustrated in FIG. 1 that may be used for calculation of traffic conditions of each lane of a plurality of lanes associated with an intersection on a road in a region, in accordance with an example embodiment. FIG. 2 is explained in conjunction with FIG. 1.

In the embodiments described herein, the system 102 may include a processing means, such as, at least one processor (hereinafter interchangeably used with processor) 202, a storage means, such as, at least one memory (hereinafter interchangeably used with memory) 204, a communication means, such as, at least one network interface (hereinafter interchangeably used with network interface) 208 and an I/O interface 210. The processor 202 may retrieve computer program instructions that may be stored in the memory 204 for execution of the computer program instructions. The memory 204 may store a machine learning model 206 (such as, a convolution neural network (CNN) model) that may be trained and tested to generate traffic congestion estimation data for determination of the traffic conditions of each lane of the plurality of lanes associated with the intersection on the road in the region 116 from the image data. In accordance with an embodiment, the processor 202 may be configured to obtain input (such as, a plurality of traffic images of the image data) from background batch data services, streaming data services or third party service providers, and renders output, such as, the generated traffic congestion estimation data and the determined traffic conditions of one or more lanes of the plurality of lanes associated with the at least one intersection in the region 116, traffic condition notification, etc., for use by a user on a user device through the network interface 208.

The processor 202 may be embodied in a number of different ways. For example, the processor 202 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 202 may include one or more processing cores configured to perform independently. A multi-core processor may enable multiprocessing within a single physical package. Additionally or alternatively, the processor 202 may include one or more processors configured in tandem via the bus to enable independent execution of instructions, pipelining and/or multithreading. Additionally or alternatively, the processor 202 may include one or more processors capable of processing large volumes of workloads and operations to provide support for big data analysis. In an example embodiment, the processor 202 may be in communication with the memory 204 via a bus for passing information among components of the system 102.

The memory 204 may be non-transitory and may include, for example, one or more volatile and/or non-volatile memories. In other words, for example, the memory 204 may be an electronic storage device (for example, a computer readable storage medium) comprising gates configured to store data (for example, bits) that may be retrievable by a machine (for example, a computing device like the processor 202). The memory 204 may be configured to store information, data, content, applications, instructions, or the like, for enabling the system 102 to carry out various functions in accordance with an example embodiment of the present disclosure. For example, the memory 204 may be configured to buffer input data for processing by the processor 202. As exemplarily illustrated in FIG. 2, the memory 204 may be configured to store instructions for execution by the processor 202. As such, whether configured by hardware or software methods, or by a combination thereof, the processor 202 may represent an entity (for example, physically embodied in circuitry) capable of performing operations according to an embodiment of the present disclosure while configured accordingly. Thus, for example, when the processor 202 is embodied as an ASIC, FPGA or the like, the processor 202 may be specifically configured hardware for conducting the operations described herein.

Alternatively, as another example, when the processor 202 is embodied as an executor of software instructions, the instructions may specifically configure the processor 202 to perform the algorithms and/or operations described herein when the instructions are executed. However, in some cases, the processor 202 may be a processor specific device (for example, a mobile terminal or a fixed computing device) configured to employ an embodiment of the present disclosure by further configuration of the processor 202 by instructions for performing the algorithms and/or operations described herein. The processor 202 may include, among other things, a clock, an arithmetic logic unit (ALU) and logic gates configured to support operation of the processor 202. The network environment, such as, 100 may be accessed using the network interface 208 of the system 102. The network interface 208 may provide an interface for accessing various features and data stored in the system 102.

The processor 202 may be configured to identify one or more objects (such as, one or more second movable objects) in the region 116, based on the image data, by using a trained machine learning model 206. In accordance with an embodiment, the processor 202 of system 102 may generate a validated machine learning model 206 and stores in the memory 204. In accordance with an embodiment, the machine learning model 206 may correspond to the Convolutional Neural Network (CNN) model. The convolutional neural network model is a type of artificial neural network model used for processing pixel data in an image for image recognition and image processing. The CNN model is based on deep learning algorithm which takes an input image as pixel data, assigns importance to various aspects or objects in the input image to extract features of the input image that are important for discrimination and suppresses irrelevant variations, and outputs a correct label for the extracted features. The machine learning model 206 may take the one or more traffic images or a video from the image data as an input, extracts features from the one or more traffic images or a set of images that constitute the video, and outputs a label for the one or more traffic images of the image data for which the machine learning model 206 is trained.

In accordance with an embodiment, the processor 202 may train the machine learning model 206 using a plurality of training image data (or training video data sets) as exemplarily illustrated with reference to FIG. 3.

The machine learning model 206 (such as, the CNN model) may comprise a plurality of layers for feature extraction and a plurality of layers for classification or labelling. The input to the machine learning model 206 (such as, the CNN model) is a multi-channel image, such as, a 3-channel RGB image. Each channel of the input image is convoluted with a kernel of a certain size. The number of kernels used for convoluting the multi-channel image may depend on the number of channels of the input image.

On convolution of the input image with the kernel, the processor 202 may be configured to obtain a convoluted image that is a feature map of the image from the machine learning model 206 (such as, the CNN model). The processor 202 reduces the dimensionality of the obtained rectified feature map but retains important information of the rectified feature map. The processor 202 reduces the dimensionality of the rectified feature map using spatial pooling, such as, Max, Average, Sum, etc. Some of the inferior features of the rectified feature map are suppressed by the dominant features of the rectified feature map.

The processor 202 employs the machine learning model 206 with an architecture similar to as disclosed above to determine a class of the input traffic images or live video data from the image data. That is, the class defines the range of objects on the road in the region 116. Based on the class, the processor 202 may determine the traffic conditions of each lane of the plurality of lanes associated with the at least one intersection in the region 116, from the image data. The specific architecture of the machine learning model 206 used for calculating the traffic condition is disclosed in the detailed description of FIG. 4B.

In accordance with an embodiment, the memory 204 may include processing instructions for training of the machine learning model 206 with training traffic image set that may be real-time data or historical data, from service providers. For an input in the training traffic image set, the processor 202 trains the machine learning model 206 to generate a corresponding class indicating different objects associated with the intersection on the road.

In some example embodiments, the I/O interface 210 may communicate with the system 102 and displays input and/or output of the system 102. As such, the I/O interface 210 may include a display and, in some embodiments, may also include a keyboard, a mouse, a joystick, a touch screen, touch areas, soft keys, one or more microphones, a plurality of speakers, or other input/output mechanisms. In one embodiment, the system 102 may comprise user interface circuitry configured to control at least some functions of one or more I/O interface elements such as a display and, in some embodiments, a plurality of speakers, a ringer, one or more microphones and/or the like. The processor 202 and/or I/O interface 210 circuitry comprising the processor 202 may be configured to control one or more functions of one or more I/O interface 210 elements through computer program instructions (for example, software and/or firmware) stored on a memory 204 accessible to the processor 202. The processor 202 may further render traffic condition notification on the user equipment 104 via the I/O interface 210.

In some embodiments, the processor 202 may be configured to provide Internet-of-Things (IoT) related capabilities to users of the system 102 disclosed herein. The IoT related capabilities may in turn be used to provide smart city solutions by providing real time parking updates, big data analysis, and sensor-based data collection by using the cloud based mapping system for providing navigation and parking recommendation services. In some embodiments, the system 102 may be configured to provide an environment for development of parking strategy recommendation solutions for navigation systems in accordance with the embodiments disclosed herein. The environment may be accessed using the network interface 208. The network interface 208 may provide an interface for accessing various features and data stored in the system 102.

FIG. 3 exemplarily illustrates schematic diagram 300 of an exemplary scenario on how to train a machine leaning model, such as a Convolutional Neural Network (CNN) model to identify movable objects in one or more lanes on a road in a region, in accordance with an example embodiment. FIG. 3 is explained in conjunction with FIG. 1 and FIG. 2.

There is shown a CNN model 302 (part of the system 102) that may be made up of a plurality of network layers (such as, input layer 308, hidden layer 310 and output layer 312) that process and transform input data 304 (traffic images from the image data) to produce output data 306 (identification of movable objects in the traffic images from the image data).

The convolutional neural network model, or CNN model 302, is network architecture for deep learning that may learn directly from images, such as a plurality of traffic images from the image data. The CNN model 302 may provide an optimal architecture for image recognition. Combined with advances in GPUs and parallel computing, the CNNs are a key technology underlying new developments in automated driving. The CNNs enable self-driving cars to detect objects and learn to tell the difference between a street sign and a pedestrian. The CNN model 302 may be trained on hundreds, thousands, or even millions of images (such as, traffic images from the image data). When working with large amounts of data and complex network architectures, GPUs can significantly speed the processing time to train the CNN model 302. Once the CNN model 302 is trained, it can be used in real-time applications, such as, but not limited to, pedestrian detection in advanced driver assistance systems (ADAS). The CNN model 302 may produce state-of-the-art recognition result and eliminate the need for manual feature extraction because the features are learned directly by the CNN model 302.

The CNN model 302 may be trained for image analysis tasks that include object identification. The CNN model 302 may have tens or hundreds of hidden layers 310. Each hidden layer 310 may learn to detect different features of an image from the input data 304 (such as, a traffic image of the region 116). In feature map, every hidden layer 310 may increase complexity of learned image features. For example, the first hidden layer may learn to detect edges, and the last hidden layer may learn to detect more complex shapes. The output layer 312 (or final layer) in the CNN model 302 may connect every neuron from the last hidden layer 310 to the output neurons to produce final output data 306 where the movable objects (such as, one or more first movable objects) on one or more lanes on an intersection of a road in the region 116 may be identified.

In accordance with an embodiment, the CNN model 302 used by the system 102 may be trained from scratch. In accordance with an embodiment, network configuration may be determined to train the CNN model 302 from scratch that provides the most control over the network and can produce impressive results, but it requires an understanding of the structure of a neural network and the many options for layer types and configuration. While results of the CNN model 302 trained from scratch may sometimes exceed transfer learning, this method tends to require more images for training, as the new network needs many examples of the object to understand the variation of features. Training times are often longer, and there are so many combinations of network layers that it can be overwhelming to configure a network from scratch. Typically, when constructing the CNN model 302 and organizing the network layers, it helps to reference other network configurations to take advantage of what researchers have proven successful.

Training the CNN model 302 from scratch may be highly accurate, although it is challenging, because hundreds of thousands of labeled images and significant computational resources are required.

In accordance with some example embodiments, the CNN model 302 used by the system 102 may be trained by transfer learning. Transfer learning may be based on the fact that knowledge for one type of problem may be used to solve a similar problem. Fine-tuning a pretrained network with transfer learning is typically much faster and easier than training from scratch that requires the least amount of data and computational resources. Transfer learning uses knowledge from one type of problem to solve similar problems. One may start with a pretrained network and use it to learn a new task. One advantage of transfer learning is that the pretrained network has already learned a rich set of features. These features can be applied to a wide range of other similar tasks. For example, a network trained on millions of images may be selected and retrained for new object classification using only hundreds of images.

The CNN model 302 may be trained to recognize vehicles (such as, trucks and cars) to initialize and train a new CNN model to be used by the system 102 that differentiates between objects on a road. The CNN model 302 may be retrained for new recognition tasks to build on pre-existing networks.

The CNN model that uses transfer learning may require less data and fewer computational resources as compared to the CNN model 302 that is trained from scratch.

In accordance with some example embodiments, the CNN model 302 may be pre-trained to extract features for training a machine learning model. For example, a hidden layer 310 that has learned how to detect edges in an image is broadly relevant to images from many different domains, such as data sets from traffic imagery. Such type of pre-trained CNN model may require fewer amounts of data and computational resources as compared to the CNN model trained to recognize the vehicles.

FIGS. 4A and 4B, exemplarily illustrates a block diagram 400A and a block diagram 400B respectively for implementation of a machine learning model, such as a Convolutional Neural Network (CNN) model in the system 102 to identify objects on one or more lanes on a road associated with an intersection in a region for calculation of traffic conditions, in accordance with an example embodiment. FIGS. 4A and 4B are explained in conjunction with FIG. 1 to FIG. 3.

With reference to FIG. 4A, there are shown blocks in the block diagram 400A, viz., image data (that includes a traffic image) 402, a trained machine learning model, such as a CNN model 404, classified output data 406, and an output traffic image 408 with labelled lanes 408A to 408D and classified objects 408E to 408G. The objects may be classified into, but not limited to, a bus 408E, a vehicle 408F, and a taxi 408G.

In accordance with an embodiment, machine learning model 404 (such as, the CNN model) may be used by the system 102 to identify objects (such as, a bus, a taxi, and a vehicle) in one or more lanes 408A to 408D of the plurality of lanes on a road associated with an intersection in the region 116 of FIG. 1. In some other embodiment, any trained machine learning model may be used to identify the objects in input traffic image of the image data 402. For example, image processing techniques or deep learning models may also be used as trained identification model to identify the objects in input traffic image of the image data 402.

The system 102 may be configured to obtain a traffic image from the image data 402, associated with the region in real time or near real time. The image data 402 associated with traffic on the intersection in the region may be obtained by the system 102 from at least one or more of background batch data services, streaming data services and third party service providers. In accordance with an embodiment, the system 102 may be configured to obtain live video data associated with the intersection on the road. The live video data may comprise one or more video clips, each having equal frame count. The system 102 may be configured to preprocess the live video data into the one or more video clips comprising a plurality of traffic images.

The CNN model 404 (hereinafter used interchangeably for trained machine learning model) of the system 102 may be configured to identify one or more objects from the traffic image of the image data 402. The processor 202 may be configured to identify, using the CNN model 404, one or more second movable objects in the region, based on the image data. The processor 202 may be configured to identify, using the CNN model 404, one or more first movable objects in the at least one lane, based on the identified one or more second movable objects and lane level information of the region. The one or more objects may be identified into movable objects and immovable objects. Further, the identified objects may be termed as one or more first movable objects and one or more second movable objects. The one or more first movable objects correspond to the identified objects in one or more lanes. The one or more second movable objects correspond to the identified objects in the region.

The processor 202 may be configured to obtain lane level information of the output traffic image 408 based on map data of the region 116. In accordance with an embodiment, the processor may be configured to compare (map match) of the image data 402 of one or more lanes in the region 116 with map data (or historic map data) that may include lane level information of the region 116. The map data of a specific lane, such as the lane 408C in the region 116 may be superimposed with live image data 402, and then the static objects may overlap in the images from the image data 402 and the map data, while the dynamic or movable objects may not be superimposed. Therefore, by using map matching, movable objects (also referred as first movable objects) in the lane 408C may be determined by the processor 202 in the region 116. Therefore, the processor 202 may be configured to identify one or more first movable objects in one or more lanes, based on the identified one or more second movable objects and lane level information.

The processor 202 may be configured to determine a count of one or more first movable objects in the one or more lanes 408A to 408D, based on the image data 402. The processor 202 may be further configured to calculate a lane object static capacity of the one or more lanes 408A to 408D in the region 116, based on one or more map free flow or speed limit attributes associated with the one or more lanes. The one or more map free flow or speed limit attributes may comprise a functional class or geometry information associated with the one or more lanes 408A to 408D. The processor 202 may be configured to generate the traffic congestion estimation data based on the count of the first movable objects in the specific lane and the lane object static capacity of the specific lane.

In accordance with an embodiment, the output image 408 with labelled classified objects may correspond to an image of the intersection at a region corresponding to an address of 5 Avenue and 34 Street in New York. The identified moveable objects may be labelled by bounding boxes in the output intersection image 408. The identified moveable objects may be identified on a lane level. In other words, the identified moveable objects may be identified in each lane of the plurality of lanes 408A to 408D on a road in the region 116 (5 Avenue and 34 Street in New York) associated with the intersection on the road.

With reference to FIG. 4B, there is shown a detailed CNN model to identify objects in plurality of input traffic images 410, a plurality of convolution and pooling layers 412A . . . 412N, fully connected layers 414, and the classified objects 416A . . . 416N.

The plurality of convolution and pooling layers 412A . . . 412N in the CNN model 404 may be used to provide activation maps and non-linear down-sampling to save computational load.

The purpose of convolution layers in the plurality of convolutional and pooling layers 412A . . . 412N is to convolve each of the plurality of input traffic images 410 and pass result to next convolution layer. The convolutional layers in the plurality of convolutional and pooling layers 412A . . . 412N may be stacked in the CNN model 404 that allows layers close to the input traffic images 410 to learn low-level features (e.g. lines) and convolution layers deeper in the CNN model 404 to learn high-order and more abstract features, like shapes or specific objects (bus, car, taxi etc.).

The purpose of pooling layers in the plurality of convolutional and pooling layers 412A . . . 412N is to streamline underlying computation. The pooling layers may reduce the dimensions of data by combining outputs of neuron clusters at one layer into a single neuron in the next layer. A limitation of feature map output of the convolutional layers is to record precise position of features in the input traffic images 410. Therefore, small movements in the position of the feature in the input traffic images 410 may result in a different feature map. Down sampling may be used to address the issue, where a lower resolution version of an input traffic images 410 may be created that still contains large or important structural elements, without fine detail that may not be as useful.

The addition of a pooling layer after the convolutional layer is a common pattern used for ordering layers within a CNN model 404 that may be repeated one or more times in the CNN model 404. The pooling layer operates upon each feature map separately to create a new set of the same number of pooled feature maps.

Finally, after the plurality of convolutional and pooling layers 412A . . . 412N, high-level reasoning in the CNN model 404 may be done via the fully connected layers 414. The fully connected layer 414 may provide mapping between output features of last step of the plurality of convolution and pooling layers 412A . . . 412N. The fully connected layers 414 may connect every neuron in one layer to every neuron in another layer. The fully connected layer 414 may classify the objects which are identified from the input traffic images 410. Neurons in the fully connected layer 414 may have connections to all activations in the previous layers. The classified objects are bus 416A, taxi 416B, truck 416C, vehicle 416D, bike 416E and train 416N. The processor 202 may use the classified objects to determine the traffic conditions of each lane of the plurality of lanes associated with intersection in the region.

FIG. 5 exemplarily illustrates a schematic diagram 500 for an exemplary scenario where the system determines traffic conditions associated with connected intersections for a road network in a region with traffic light cycle data, in accordance with an example embodiment. FIG. 5 is explained in conjunction with FIG. 1 to FIGS. 4A and 4B.

In accordance with an embodiment, the processor 202 may be configured to obtain traffic light (TL) cycle information (or traffic light (TL) cycle data) for one or more lanes in a region. The traffic light cycle data may be SPaT data. The SPaT data may correspond to real time data about traffic Signal Phase and Timing (SPaT) to broadcast for signalized intersections and received by vehicles, such as the vehicle 120. In accordance with an embodiment, the traffic light cycle data related to connected intersections may be retrieved from map data of the map database 106B to cover a large road network for calculation of the traffic conditions of the region covering a large road network. The traffic conditions for the large road network may be determined in a pre-defined time interval.

There is shown the traffic light cycle information for 8 signal phases, viz. 501 to 508 for several lanes to validate the traffic condition in case it is in the TL red phase cycle. The traffic light cycle information may include one of red, yellow and green color data to indicate whether vehicles in a lane should stop, proceed with caution, and proceed, respectively. The processor 202 may be configured to validate the traffic condition based on the TL cycle information.

FIG. 6 exemplarily illustrates a tabular representation 600 of calculation of traffic conditions of plurality of lanes associated with an intersection in a region by the system 102, in accordance with an example embodiment. FIG. 6 is explained in conjunction with FIG. 1 to FIG. 5.

With reference to the FIG. 6, the processor 202 of the system 102 may be configured to identify 7 lanes associated with an intersection on a road in a region, based on the map data and the image data. The lanes are labelled lane 1 to lane 7. Direction, lane attributes, lane object static capacity (also referred as capacity), vehicle count, time stamp against which the tabular data is recorded, and calculated time stamp is shown in the tabular representation of the FIG. 6. Lane 1 is the left turn lane and its capacity is 5 vehicles. Capacity of 5 vehicles expresses that when any vehicle counts at any time exceed 5, it means degree of congestion (that is, traffic condition) in lane 1 is moderate congestion. The vehicle count on lane 1 is 3, therefore, it reaches 60% of the lane 1 capacity.

The traffic congestion may hamper drivers, for example by prolonging travel time, by increasing the likelihood of collisions, or by forcing drivers onto unfamiliar or undesirable travel routes. Therefore, information about traffic patterns, if collected and relayed to drivers or vehicles in a timely manner, may allow drivers or vehicles to adjust their travel plans to increase safety and convenience. The degree of congestion may be classified into different category, such as heavy congestion, moderate congestion or no congestion. For example, the traffic congestion may be classified into heavy congestion when the value of the congestion lies in between 70%-100%, the traffic congestion may be classified into moderate congestion when the value of the congestion lies in between 50%-69% and may be classified into no congestion when the value of the congestion lies in between 1%-49%. Saturated or oversaturated traffic conditions may result in the intersection's failure.

Based on the data in the tabular representation in FIG. 6, a user of a vehicle (such as the vehicle 120) or the vehicle 120 itself can make an appropriate decision to drive safely, avoid traffic congestion and identify the best route. In an embodiment, the vehicle may change its maneuver, thereby creating a safer city. The data in the tabular representation in FIG. 6 may further be validated by using the SPaT information if available (similar to the example shown in FIG. 5).

FIG. 7 illustrates a flowchart for implementation of an exemplary method to calculate traffic condition of one or more lanes associated with an intersection in a region, in accordance with an example embodiment. The control starts at 702.

At 704, image data associated with a region may be obtained. The processor 202 may be configured to obtain the image data associated with the region.

At 706, map data of the region may be obtained. The processor 202 may be configured to obtain the map data of the region.

At 708, lane level information of the region may be obtained. The processor 202 may be configured to obtain lane level information of the region, based on the map data of region At 710, traffic light (TL) cycle information for at least one lane may be obtained. The processor 202 may be configured to obtain the TL cycle information for at least one lane.

At 712, one or more second movable objects in the region may be identified. The processor 202 may be configured to identify the one or more second movable objects in the region, using trained machine learning model, based on the image data.

At 714, one or more first movable objects may be identified in the at least one lane. The processor 202 may be configured to identify one or more first movable objects in the at least one lane, based on the identified one or more second movable objects and the lane level information.

At 716, count of one or more first movable objects in at least one lane may be determined. The processor 202 may be configured to determine the count of one or more first movable objects in at least one lane, based on the image data.

At 718, lane object static capacity of at least one lane may be calculated. The processor 202 may be configured to calculate the lane object static capacity of at least one lane, based on one or more map free flow or speed limit attributes associated with the at least one lane. The one or more map free flow or speed limit attributes may comprise a functional class or geometry information associated with the at least one lane.

At 720, traffic congestion estimation data may be generated. The processor 202 may be configured to generate traffic congestion estimation data based on the count of the one or more first movable objects in the at least one lane and the lane object static capacity of the at least one lane.

At 722, traffic condition for the at least one lane may be calculated. The processor 202 may be configured to calculate the traffic condition for the at least one lane, based on the traffic congestion estimation data. The traffic condition is a ratio between the count of the one or more first movable objects and the lane object static capacity.

At 724, degree of congestion may be determined. The processor 202 may be configured to determine the degree of congestion, based on the traffic condition. The degree of congestion indicates one of heavy congestion, moderate congestion or no congestion.

At 726, traffic condition based on TL cycle information may be validated. The processor 202 may be configured to validate the TL cycle information.

At 728, map data of the region may be updated. The processor 202 may be configured to update the map data of the region in the map database. The control passes to the end 730.

Accordingly, blocks of the flowchart 700 support combinations of means for performing the specified functions and combinations of operations for performing the specified functions for performing the specified functions. It will also be understood that one or more blocks of the flowchart 700, and combinations of blocks in the flowchart 700, can be implemented by special purpose hardware-based computer systems which perform the specified functions, or combinations of special purpose hardware and computer instructions.

FIG. 8 illustrates a flowchart for implementation of an exemplary method to calculate traffic condition of connected intersection in an area or polygon, in accordance with an embodiment. The control starts at 802.

At 804, determined traffic conditions for each intersection in the area or polygon may be retrieved. In accordance with an embodiment, the processor 202 may be configured to retrieve the determined traffic conditions for all the intersections in the area or polygon from the map database 106B. There may be one or more intersections on a road with plurality of lanes on the road in the area.

At 806, connected intersection data may be retrieved. In accordance with an embodiment, the processor 202 may be configured to retrieve the connected intersection data from the map database 106B.

At 808, predict or determine the overall traffic conditions in the area or the polygon. In accordance with an embodiment, the processor 202 may be configured to predict or determine the overall traffic conditions in the area or the polygon. The overall traffic conditions in the area or the polygon may be based on the determined traffic conditions for each intersection in the area or polygon and the connected intersection data.

At 810, the predicted overall traffic conditions in the area may be reported. In accordance with an embodiment, the processor 202 may be configured to report the predicted overall traffic conditions in the area by rendering the data associated with the predicted overall traffic conditions on a user device. The control passes to the end at 812.

Accordingly, blocks of the flowchart 800 support combinations of means for performing the specified functions and combinations of operations for performing the specified functions for performing the specified functions. It will also be understood that one or more blocks of the flowchart 800, and combinations of blocks in the flowchart 800, can be implemented by special purpose hardware-based computer systems which perform the specified functions, or combinations of special purpose hardware and computer instructions.

Alternatively, the system may comprise means for performing each of the operations described above. In this regard, according to an example embodiment, examples of means for performing operations may comprise, for example, the processor 202 and/or a device or circuit for executing instructions or executing an algorithm for processing information as described above.

On implementing the method 700 and 800 disclosed herein, the end result generated by the system 102 is a tangible determination of traffic conditions of each lane of plurality of lanes on a road associated with intersection from traffic images or traffic video data from the image data. The determination of the traffic conditions is of utmost importance to avoid mishaps from happening on roads, busy streets, highways, freeways, etc. In case of testing and deployment of autonomous vehicles, the remote determination of the traffic conditions on a vehicle may be used to study the behavior of the autonomous vehicles and effects of collisions on the structure of the autonomous vehicle.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for generating traffic congestion estimation data associated with at least one lane associated to an intersection in a region, the system comprising:
   at least one non-transitory memory configured to store computer program code instructions; and
   at least one processor configured to execute the computer program code instructions to:
   obtain image data associated with the region, wherein one or more image capture devices installed at the intersection capture the image data in the at least one lane associated with the intersection in the region;
   determine a count of one or more first movable objects in the at least one lane, based on the image data;
   calculate a lane object static capacity of the at least one lane, based on one or more map free flow or speed limit attributes associated with the at least one lane;
   calculate a lane object dynamic capacity of the at least one lane, based on the one or more map free flow or speed limit attributes associated with the at least one lane and a current speed on the lane object derived from the image data;
   generate the traffic congestion estimation data based on the count of the one or more first movable objects in the at least one lane, the lane object static capacity of the at least one lane and the lane object dynamic capacity of the at least one lane; and
   calculate a traffic condition for the at least one lane based on the traffic congestion estimation data, wherein the traffic condition is a ratio between the count of the one or more first movable objects and the lane object static capacity.

2. The system of claim 1, wherein to determine the count of the one or more first movable objects, the at least one processor is further configured to:
   obtain lane level information of the region based on map data of the region;
   identify, using a trained machine learning model, one or more second movable objects in the region, based on the image data; and
   identify the one or more first movable objects in the at least one lane, based on the identified one or more second movable objects and the lane level information.

3. The system of claim 1, wherein the one or more map free flow or speed limit attributes comprise a functional class or geometry information associated with the at least one lane.

4. The system of claim 1, wherein the at least one processor is further configured to determine a degree of congestion based on the traffic condition, wherein the degree of congestion indicates one of heavy congestion, moderate congestion or no congestion.

5. The system of claim 1, wherein the at least one processor is further configured to:
   retrieve traffic light (TL) cycle information for the at least one lane; and
   validate the traffic condition based on the TL cycle information.

6. The system of claim 1, wherein the at least one processor is further configured to transmit a report of the traffic condition to a backend server.

7. The system of claim 5, wherein the at least one processor is further configured to:
   obtain map data of the region; and
   update the map data of the region based on the validated traffic condition.

8. A method for generating traffic congestion estimation data associated with at least one lane in a region, the method comprising:
   obtaining image data associated with the region, wherein one or more image capture devices installed at the intersection capture the image data in the at least one lane associated with the intersection in the region;
   determining a count of one or more first movable objects in the at least one lane, based on the image data;
   determining a count of one or more movable objects appearing in multiple image frame data;
   determining a count of one or more movable objects moving speed based on image data consisting of multiple image frame along with associated timestamp data;
   calculating a lane object static capacity of the at least one lane, based on one or more map free flow or speed limit attributes associated with the at least one lane;
   generating the traffic congestion estimation data based on the count of the one or more first movable objects in the at least one lane and the lane object static capacity of the at least one lane;

generating the traffic congestion estimation data based on the count of the one or more first movable objects in the at least one in image data consisting of multiple image frame; and calculating a traffic condition for the at least one lane based on the traffic congestion estimation data, wherein the traffic condition is a ratio between the count of the one or more first movable objects and the lane object static capacity.

9. The method of claim 8, wherein the method of determining the count of the one or more first movable objects further comprises:

obtaining lane level information of the region based on map data of the region;

identifying, using a trained machine learning model, one or more second movable objects in the region, based on the image data; and identifying the one or more first movable objects in the at least one lane, based on the identified one or more second movable objects and the lane level information.

10. The method of claim 8, wherein the one or more map free flow or speed limit attributes include a functional class or geometry information associated with the at least one lane.

11. The method of claim 8, further comprising determining a degree of congestion based on the traffic condition, wherein the degree of congestion indicates one of heavy congestion, moderate congestion or no congestion.

12. The method of claim 8, further comprising:

retrieving traffic light (TL) cycle information for the at least one lane; and validating the traffic condition based on the TL cycle information.

13. The method of claim 8, further comprising transmitting a report of the traffic condition to a backend server.

14. The method of claim 12, further comprising:

obtaining map data of the region; and updating the map data of the region based on the validated traffic condition.

15. A computer programmable product comprising a non-transitory computer readable medium having stored thereon computer executable instructions, which when executed by one or more processors, cause the one or more processors to carry out operations for generating traffic congestion estimation data associated with at least one lane in a region, the operations comprising:

obtaining image data associated with the region, wherein one or more image capture devices installed at the intersection capture the image data in the at least one lane associated with the intersection in the region;

determining a count of one or more first movable objects in the at least one lane, based on the image data;

calculating a lane object static capacity of the at least one lane, based on one or more map free flow or speed limit attributes associated with the at least one lane;

generating the traffic congestion estimation data based on the count of the one or more first movable objects in the at least one lane and the lane object static capacity of the at least one lane; and calculate a traffic condition for the at least one lane based on the traffic congestion estimation data, wherein the traffic condition is a ratio between the count of the one or more first movable objects and the lane object static capacity.

16. The computer program product of claim 15, wherein the operation of determining the count of the one or more first movable objects further comprises:

obtaining lane level information of the region based on map data of the region;

identifying, using a trained machine learning model, one or more second movable objects in the region, based on the image data; and identifying the one or more first movable objects in the at least one lane, based on the identified one or more second movable objects and the lane level information.

17. The computer program product of claim 15, wherein the operations further comprise:

retrieving traffic light (TL) cycle information for the at least one lane; and validating the traffic condition based on the TL cycle information.

* * * * *